(12) United States Patent
Gu et al.

(10) Patent No.: US 9,396,387 B2
(45) Date of Patent: Jul. 19, 2016

(54) IMAGE IDENTIFICATION METHOD AND IMAGE IDENTIFICATION DEVICE BASED ON FINGERTIP TRACKING

(71) Applicant: BAIDU ONLINE NETWORK TECHNOLOGY (BEIJING) CO., LTD., Beijing (CN)

(72) Inventors: Jiawei Gu, Beijing (CN); Yinan Yu, Beijing (CN); Rui Wang, Beijing (CN); Kai Yu, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 14/571,950

(22) Filed: Dec. 16, 2014

(65) Prior Publication Data

US 2016/0125236 A1    May 5, 2016

(30) Foreign Application Priority Data

Oct. 29, 2014    (CN) .......................... 2014 1 0594523

(51) Int. Cl.
  *G06K 9/00*    (2006.01)
  *G06F 3/00*    (2006.01)
  *G06F 3/01*    (2006.01)
  *G06F 3/048*   (2013.01)
  *G06T 5/20*    (2006.01)

(52) U.S. Cl.
  CPC .............. *G06K 9/00389* (2013.01); *G06F 3/00* (2013.01); *G06F 3/01* (2013.01); *G06F 3/017* (2013.01); *G06F 3/048* (2013.01); *G06K 9/00355* (2013.01); *G06T 5/20* (2013.01); *G06T 2207/10004* (2013.01); *G06T 2207/20036* (2013.01); *G06T 2207/30196* (2013.01)

(58) Field of Classification Search
  None
  See application file for complete search history.

(56) References Cited

U.S. PATENT DOCUMENTS

| 7,308,112 | B2 * | 12/2007 | Fujimura | G06K 9/00355 382/103 |
| 8,005,263 | B2 * | 8/2011 | Fujimura | G06F 3/017 379/52 |
| 8,290,210 | B2 * | 10/2012 | Fahn | G06F 3/017 382/103 |
| 8,499,257 | B2 * | 7/2013 | Mattingly | G06F 3/017 345/158 |
| 8,782,566 | B2 * | 7/2014 | Sarkar | 715/728 |
| 8,971,572 | B1 * | 3/2015 | Yin | G06K 9/00355 345/173 |
| 9,076,257 | B2 * | 7/2015 | Sharma | G06F 3/017 |

(Continued)

OTHER PUBLICATIONS

Oka et al."Real-time fingertip tracking and gesture recognition", Dec. 2002, IEEE Computer Graphics and Applications, 22(6):64-71.*

*Primary Examiner* — Jason Heidemann
(74) *Attorney, Agent, or Firm* — Hodgson Russ LLP

(57) ABSTRACT

An image identification method and an image identification device are provided. The method comprises acquiring a hand feature region within a sight from a first view by skin color detection; acquiring a feature and a position of a tip of a finger from the hand feature region by performing a pattern recognition for a morphological feature of a stretched hand; recording an interframe displacement of a feature point of the tip of the finger when the tip of the finger delimits a periphery of a target object to obtain a delimiting trajectory from the interframe displacement, closing the delimiting trajectory to form a full-perimeter geometry; projecting the full-perimeter geometry on a plane where a direction of the sight is perpendicular to a plane where the target object is located to obtain a projection region, performing an image identification using the projection region as an identification region of the target object.

7 Claims, 2 Drawing Sheets

(56) References Cited

U.S. PATENT DOCUMENTS

| | | | | |
|---|---|---|---|---|
| 9,135,503 B2* | 9/2015 | Sundaresan | ............ | G06F 3/017 |
| 9,195,305 B2* | 11/2015 | Markovic | ................ | G06F 3/011 |
| 2003/0095140 A1* | 5/2003 | Keaton | .................... | G06F 3/011 |
| | | | | 715/700 |
| 2005/0271279 A1* | 12/2005 | Fujimura | ........... | G06K 9/00355 |
| | | | | 382/203 |
| 2009/0160767 A1* | 6/2009 | Sugaya | ................. | G06F 3/0346 |
| | | | | 345/157 |
| 2012/0076369 A1* | 3/2012 | Abramovich | ...... | G06K 9/00033 |
| | | | | 382/124 |
| 2012/0134536 A1* | 5/2012 | Myokan | ............. | G06K 9/00355 |
| | | | | 382/103 |
| 2014/0177909 A1* | 6/2014 | Lin | .................... | G06K 9/00355 |
| | | | | 382/103 |

* cited by examiner

IMAGE IDENTIFICATION METHOD AND IMAGE IDENTIFICATION DEVICE BASED ON FINGERTIP TRACKING

CROSS-REFERENCE TO RELATED APPLICATION

This application claims priority to and benefits of Chinese Patent Application Serial No. 201410594523.3, filed with the State Intellectual Property Office of P. R. China on Oct. 29, 2014, the entire content of which is incorporated herein by reference.

FIELD

The present disclosure relates to the field of Internet, and more particularly to an image identification method and an image identification device.

BACKGROUND

In the related art, the input for image identification and machine vision recognition is performed by first taking pictures and then determining a target object. Specifically, pictures are first taken, foreground environment images and background environment images of the target object are saved, and then the target object is selected by delimiting the target object on a screen by a finger and segmented so as to perform the image identification. In this way, the pictures shot need to subject to human intervention, for example, the pictures need to be delimited manually, such that the operation step is complicated and the experience of a user is not smooth. In addition, the above process is only applicable to smart terminals with touch screens, and thus the applicability is poor.

SUMMARY

Embodiments of the present disclosure seek to solve at least one of the problems existing in the related art to at least some extent.

According to a first aspect of the present disclosure, an image identification method is provided. The image identification method comprises acquiring, at one or more computing devices, a hand feature region within a sight from a first view by a skin color detection, and capturing and tracking the hand feature region in real time; acquiring, at the one or more computing devices, a feature and a position of a tip of a finger from the hand feature region by performing a pattern recognition for a morphological feature of a stretched hand, and capturing and tracking the feature and the position of the tip of the finger in real time; recording, using the one or more computing devices, an interframe displacement of a feature point of the tip of the finger when the tip of the finger delimits a periphery of a target object to obtain a delimiting trajectory from the interframe displacement, and closing the delimiting trajectory to form a full-perimeter geometry; projecting, using the one or more computing devices, the full-perimeter geometry on a plane where a direction of the sight is perpendicular to a plane where the target object is located so as to obtain a projection region; and performing, using the one or more computing devices, an image identification using the projection region as an identification region of the target object.

With the image identification method according to embodiments of the present disclosure, the hand feature region within the sight from the first view of a user is acquired by the skin color detection, and the feature and the position of the tip of the finger are acquired from the hand feature region by performing the pattern recognition for the morphological feature of the stretched hand. The interframe displacement of the feature point of the tip of the finger is recorded when the tip of the finger delimits the periphery of the target object to obtain the delimiting trajectory from the interframe displacement, and the delimiting trajectory is closed to form the full-perimeter geometry. Then, the full-perimeter geometry is projected on the plane where the direction of the sight of the user is perpendicular to the plane where the target object is located so as to obtain the projection region, and the image identification is performed using the projection region as the identification region of the target object. Thus, when a user performs the image identification on the target object, he/she only needs to stretch out a finger and delimit the periphery of the target object with the tip of the finger directed at the periphery of the target object so as to perform the delimiting and image segmentation on the target object quickly, which may be used as an identification input for the image identification of the target object, such that the operation is simple, the experience of the user is better, and the applicability is high.

According to a second aspect of the present disclosure, an image identification device is provided. The image identification device comprises one or more computing devices configured to execute one or more software modules, the one or more software modules including: a first acquiring module configured to acquire a hand feature region within a sight from a first view by a skin color detection; a first tracking module configured to capture and track the hand feature region in real time; a second acquiring module configured to acquire a feature and a position of a tip of a finger from the hand feature region by performing a pattern recognition for a morphological feature of a stretched hand; a second tracking module configured to capture and track the feature and the position of the tip of the finger in real time; a recording module configured to record an interframe displacement of a feature point of the tip of the finger when the tip of the finger delimits a periphery of a target object to obtain a delimiting trajectory from the interframe displacement, and to close the delimiting trajectory to form a full-perimeter geometry; and a projecting module configured to project the full-perimeter geometry on a plane where a direction of the sight is perpendicular to a plane where the target object is located so as to obtain a projection region, and to perform an image identification using the projection region as an identification region of the target object.

With the image identification device according to embodiments of the present disclosure, the first acquiring module acquires the hand feature region within the sight of a user from the first view by the skin color detection, and the second acquiring module acquires the feature and the position of the tip of the finger from the hand feature region captured and tracked by the first tracking module by performing the pattern recognition for the morphological feature of the stretched hand. The recording module records the interframe displacement of the feature point of the tip of the finger when the tip of the finger delimits the periphery of the target object to obtain the delimiting trajectory from the interframe displacement, and closes the delimiting trajectory to form the full-perimeter geometry. Then, the projecting module projects the full-perimeter geometry on the plane where the direction of the sight is perpendicular to the plane where the target object is located so as to obtain the projection region, and performs the image identification using the projection region as the identification region of the target object. Thus, when a user performs the image identification on the target object, he/she only needs to stretch out a finger and delimit the periphery of the target object with the tip of the finger directed at the periphery of the target object so as to perform the delimiting and image segmentation on the target object quickly, which may be used as an identification input for the image identification of the target object, such that the operation is simple, the experience of the user is better, and the applicability is high.

According to a third aspect of the present disclosure, a non-transitory computer readable storage medium is provided. The computer readable storage medium comprises a computer program for executing the image identification method according to the first aspect of the present disclosure, when running on a computer.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
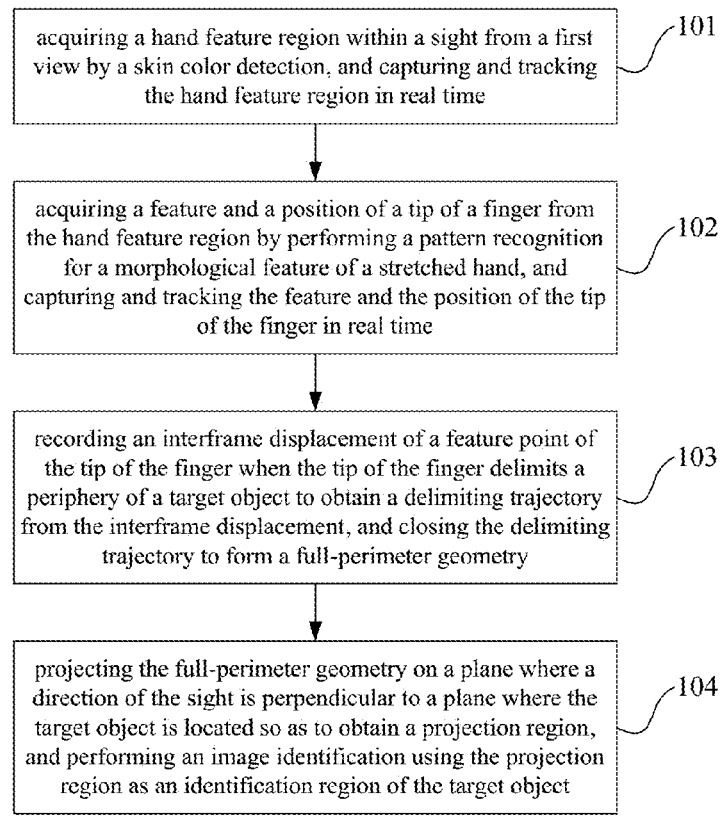
FIG. 1 is a flow chart of an image identification method according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

FIG. 1 is a flow chart of an image identification method according to an embodiment of the present disclosure.

As shown in FIG. 1, the image identification method comprises the following steps that may be performed by one or more computing devices.

In step 101, a hand feature region within a sight from a first view is acquired by a skin color detection, and the hand feature region is captured and tracked in real time.

Further, before the hand feature region within the sight from the first view is acquired by the skin color detection, an image identification request input via speech, a touch screen or a dynamic sensor is received so as to trigger an operation of acquiring the hand feature region within the sight from the first view by the skin color detection.

In step 102, a feature and a position of a tip of a finger are acquired from the hand feature region by performing a pattern recognition for a morphological feature of a stretched hand, and the feature and the position of the tip of the finger are captured and tracked in real time.

In step 103, an interframe displacement of a feature point of the tip of the finger is recorded when the tip of the finger delimits a periphery of a target object to obtain a delimiting trajectory from the interframe displacement, and the delimiting trajectory is closed to form a full-perimeter geometry.

Specifically, closing the delimiting trajectory to form the full-perimeter geometry comprises: closing the delimiting trajectory to form the full-perimeter geometry by a closed curve optimization algorithm.

In step 104, the full-perimeter geometry is projected on a plane where a direction of the sight is perpendicular to a plane where the target object is located so as to obtain a projection region, and an image identification is performed using the projection region as an identification region of the target object.

With the image identification method according to embodiments of the present disclosure, the hand feature region within the sight from the first view of a user is acquired by the skin color detection, and the feature and the position of the tip of the finger are acquired from the hand feature region by performing the pattern recognition for the morphological feature of the stretched hand. The interframe displacement of the feature point of the tip of the finger is recorded when the tip of the finger delimits the periphery of the target object to obtain the delimiting trajectory from the interframe displacement, and the delimiting trajectory is closed to form the full-perimeter geometry. Then, the full-perimeter geometry is projected on the plane where the direction of the sight of the user is perpendicular to the plane where the target object is located so as to obtain the projection region, and the image identification is performed using the projection region as the identification region of the target object. Thus, when a user performs the image identification on the target object, he/she only needs to stretch out a finger and delimit the periphery of the target object with the tip of the finger directed at the periphery of the target object so as to perform the delimiting and image segmentation on the target object quickly, which may be used as an identification input for the image identification of the target object, such that the operation is simple, the experience of the user is better, and the applicability is high.

Figure 2:
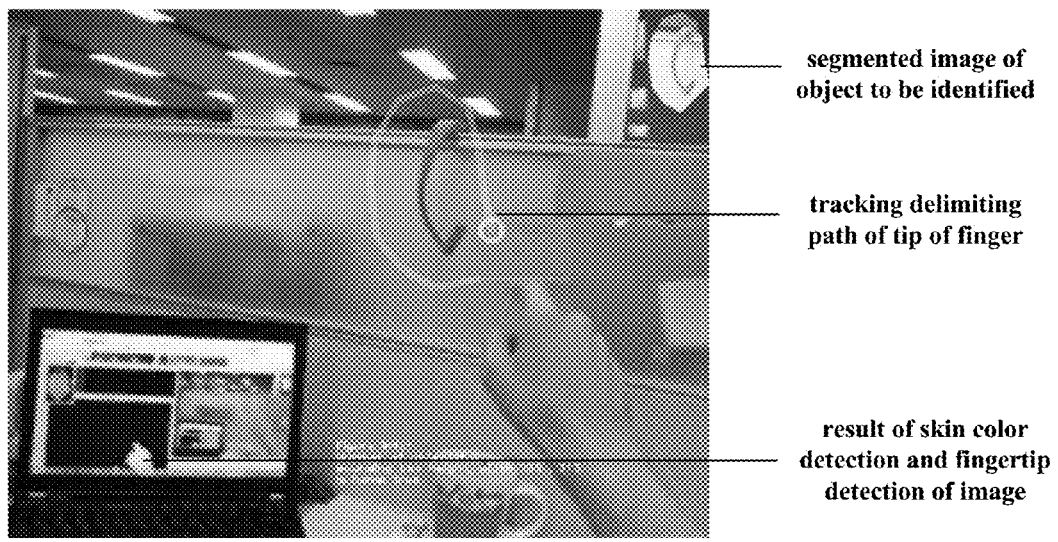
FIG. 2 is a schematic diagram of an image identification method according to another embodiment of the present disclosure.

FIG. 2 is a schematic diagram of an image identification method according to another embodiment of the present disclosure.

As shown in FIG. 2, in this embodiment, after a smart device with a camera receives an image identification request input by a user via speech, a touch screen or a dynamic sensor, the camera on the smart device is turned on. A hand feature region within a sight of the user from a first view is acquired by a skin color detection, and the hand feature region is captured and tracked in real time. The user is guided by an interactive means such as speech to identify and capture a feature point of a tip of a finger, and then guided to complete a gesture of delimiting a periphery of a target object. When the tip of the finger delimits the periphery of the target object, a delimiting path of the tip of the finger is tracked, an interframe displacement of the feature point of the tip of the finger is recorded to obtain a delimiting trajectory from the interframe displacement, and the delimiting trajectory is closed to form a full-perimeter geometry. The full-perimeter geometry is projected on a plane where a direction of the sight of the user is perpendicular to a plane where the target object is located so as to obtain a projection region, and an image identification is performed using the projection region as an identification region of the target object. Thus, an image segmentation and identification are performed in a natural delimiting behavior, and then the identification result is output to the user via an audio output channel or a screen image output channel of the smart device so as to complete the identification of the target object.

In some embodiments, the target object is an object at a far distance from the user, an object the user cannot touch, a large object, or a fixed object which cannot be moved. However, the present disclosure is not limited thereby, and the particular morphology of the target object is not limited in the present disclosure.

In some embodiments, the smart device with the camera may be a smart mobile terminal with a camera, a headset wearable device (e.g., Google Glass or BaiduEye) with a camera, a smart watch with a camera, or a robot with a camera visual input. However, the present disclosure is not limited thereby.

Figure 3:
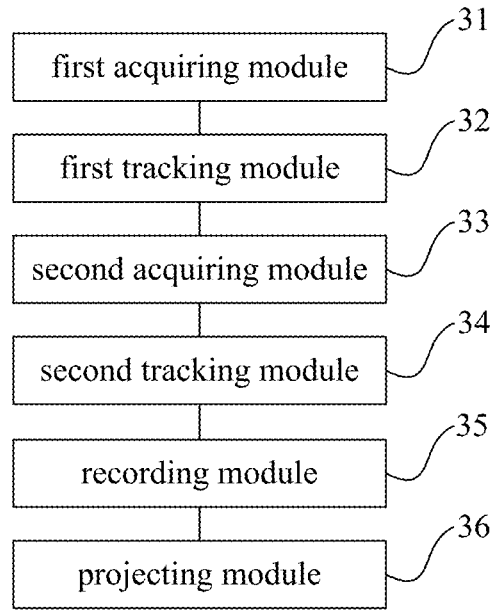
FIG. 3 is a block diagram of an image identification device according to an embodiment of the present disclosure.

FIG. 3 is a block diagram of an image identification device according to an embodiment of the present disclosure. The image identification device in this embodiment may be used to realize the image identification method as shown in FIG. 1.

As shown in FIG. 3, the image identification device comprises a first acquiring module 31, a first tracking module 32, a second acquiring module 33, a second tracking module 34, a recording module 35 and a projecting module 36. The modules 31-36 may be configured to be executed by one or more computing devices.

The first acquiring module 31 is configured to acquire a hand feature region within a sight from a first view by a skin color detection.

The first tracking module 32 is configured to capture and track the hand feature region acquired by the first acquiring module 31 in real time.

The second acquiring module 33 is configured to acquire a feature and a position of a tip of a finger from the hand feature region captured and tracked by the first tracking module 32 by performing a pattern recognition for a morphological feature of a stretched hand.

The second tracking module 34 is configured to capture and track the feature and the position of the tip of the finger in real time.

The recording module 35 is configured to record an interframe displacement of a feature point of the tip of the finger when the tip of the finger delimits a periphery of a target object to obtain a delimiting trajectory from the interframe displacement, and to close the delimiting trajectory to form a full-perimeter geometry. In some embodiments, the recording module 35 closes the delimiting trajectory to form the full-perimeter geometry by a closed curve optimization algorithm.

The projecting module 36 is configured to project the full-perimeter geometry on a plane where a direction of the sight is perpendicular to a plane where the target object is located so as to obtain a projection region, and to perform an image identification using the projection region as an identification region of the target object.

In some embodiments, the image identification device may be a smart device with a camera, or a part of the smart device with the camera, in which a part or all of the functions of the first acquiring module 31, the first tracking module 32, the second acquiring module 33, the second tracking module 34, and/or the recording module 35 may be performed by the camera of the smart device.

In some embodiments, the smart device with the camera may be a smart mobile terminal with a camera, a headset wearable device (e.g., Google Glass or BaiduEye) with a camera, a smart watch with a camera, or a robot with a camera visual input. However, the present disclosure is not limited thereby.

With the image identification device according to embodiments of the present disclosure, the first acquiring module 31 acquires the hand feature region within the sight of a user from the first view by the skin color detection, and the second acquiring module 33 acquires the feature and the position of the tip of the finger from the hand feature region captured and tracked by the first tracking module 32 by performing the pattern recognition for the morphological feature of the stretched hand. The recording module 35 records the interframe displacement of the feature point of the tip of the finger when the tip of the finger delimits the periphery of the target object to obtain the delimiting trajectory from the interframe displacement, and closes the delimiting trajectory to form the full-perimeter geometry. Then, the projecting module 36 projects the full-perimeter geometry on the plane where the direction of the sight is perpendicular to the plane where the target object is located so as to obtain the projection region, and performs the image identification using the projection region as the identification region of the target object. Thus, when a user performs the image identification on the target object, he/she only needs to stretch out a finger and delimit the periphery of the target object with the tip of the finger directed at the periphery of the target object so as to perform the delimiting and image segmentation on the target object quickly, which may be used as an identification input for the image identification of the target object, such that the operation is simple, the experience of the user is better, and the applicability is high.

Figure 4:
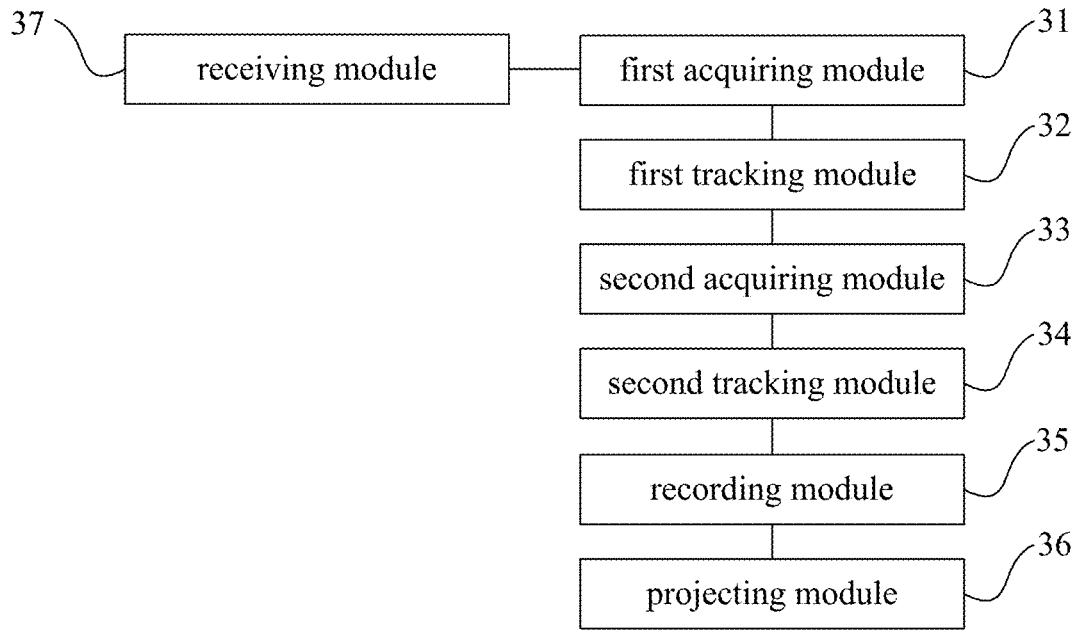
FIG. 4 is a block diagram of an image identification device according to another embodiment of the present disclosure.

FIG. 4 is a block diagram of an image identification device according to another embodiment of the present disclosure.

The image identification device in this embodiment differs from that shown in FIG. 3 in that the image identification device shown in FIG. 4 further comprises a receiving module 37.

The receiving module 37 is configured to receive an image identification request input via speech, a touch screen or a dynamic sensor so as to trigger an operation of acquiring the hand feature region within the sight from the first view by the skin color detection.

In other words, in this embodiment, after the receiving module 37 receives the image identification request input by a user via speech, the touch screen or the dynamic sensor, a camera is turned on. The first acquiring module 31 acquires a hand feature region within a sight of the user from a first view by a skin color detection, and the first tracking module 32 captures and tracks the hand feature region in real time. The user is guided by an interactive means such as speech to identify and capture a feature point of a tip of a finger, and then guided to complete a gesture of delimiting a periphery of a target object. When the tip of the finger delimits the periphery of the target object, the second tracking module 34 tracks a delimiting path of the tip of the finger, the recording module 35 records an interframe displacement of the feature point of the tip of the finger to obtain a delimiting trajectory from the interframe displacement, and closes the delimiting trajectory to form a full-perimeter geometry. The projecting module 36 projects the full-perimeter geometry on a plane where a direction of the sight of the user is perpendicular to a plane where the target object is located so as to obtain a projection region, and performs an image identification using the projection region as an identification region of the target object. Thus, an image segmentation and identification are performed in a natural delimiting behavior, and then the identification result is output to the user via an audio output channel or a screen image output channel of the smart device so as to complete the identification of the target object.

With the image identification device according to embodiments of the present disclosure, when a user performs the image identification on the target object, he/she only needs to stretch out a finger and delimit the periphery of the target object with the tip of the finger directed at the periphery of the target object so as to perform the delimiting and image segmentation on the target object quickly, which may be used as an identification input for the image identification of the target object, such that the operation is simple, the experience of the user is better, and the applicability is high.

Image identification is the most important breakthrough in artificial intelligence, and has quite a wide range of valuable use scenes, which is the top priority in the future search field. The present disclosure employs a new human-computer interaction and a natural user interface, which is more natural and more convenient compared with the conventional image identification by first taking pictures and then delimiting the target object. Natural interaction is particularly important for the image identification function of a smart wearable device, and in the present disclosure, the user may directly delimit a remote object in front of he/she to obtain a search result, which may realize a more natural interaction and a better experience of the user.

The image identification method according to embodiments of the present disclosure may be applied to various smart devices performing visual image information capturing and processing from the first view, and may provide a basic technical support for the gesture recognition of smart wearable vision products.

A non-transitory computer readable storage medium according to embodiments of the present disclosure is also provided. The computer readable storage medium comprises a computer program for executing the image identification method according to the above embodiments of the present disclosure, when running on a computer.

It should be noted that, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present disclosure, "a plurality of" means two or more than two, unless specified otherwise.

It will be understood that, the flow chart or any process or method described herein in other manners may represent a module, segment, or portion of code that comprises one or more executable instructions to implement the specified logic function(s) or that comprises one or more executable instructions of the steps of the progress. Although the flow chart shows a specific order of execution, it is understood that the order of execution may differ from that which is depicted. For example, the order of execution of two or more boxes may be scrambled relative to the order shown.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc. Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A computer-implemented image identification method, comprising:
   acquiring, at one or more computing devices, a hand feature region within a sight from a first view by a skin color detection, and capturing and tracking the hand feature region in real time;
   acquiring, at the one or more computing devices, a feature and a position of a tip of a finger from the hand feature region by performing a pattern recognition for a morphological feature of a stretched hand, and capturing and tracking the feature and the position of the tip of the finger in real time in the first view;

recording, using the one or more computing devices, an interframe displacement of a feature point of the tip of the finger when the tip of the finger delimits a periphery of a target object located in the first view to obtain a delimiting trajectory from the interframe displacement, and closing the delimiting trajectory to form a full-perimeter geometry;

projecting, using the one or more computing devices, the full-perimeter geometry on a plane where a direction of the sight is perpendicular to a plane where the target object is located so as to obtain a projection region, so as to separate the projection region from the first view as a segmented image; and performing, using the one or more computing devices, an image identification using the projection region as an identification region of the target object.

2. The image identification method according to claim 1, wherein closing the delimiting trajectory to form the full-perimeter geometry comprises:

closing the delimiting trajectory to form the full-perimeter geometry by a closed curve optimization algorithm.

3. The image identification method according to claim 1, further comprising:

receiving, at the one or more computing devices, an image identification request input via speech, a touch screen or a dynamic sensor so as to trigger an operation of acquiring the hand feature region within the sight from the first view by the skin color detection.

4. An image identification device, comprising:

one or more processors configured to execute one or more software modules, the one or more software modules including:

a first acquiring module configured to acquire a hand feature region within a sight from a first view by a skin color detection;

a first tracking module configured to capture and track the hand feature region in real time in the first view;

a second acquiring module configured to acquire a feature and a position of a tip of a finger from the hand feature region by performing a pattern recognition for a morphological feature of a stretched hand;

a second tracking module configured to capture and track the feature and the position of the tip of the finger in real time;

a recording module configured to record an interframe displacement of a feature point of the tip of the finger when the tip of the finger delimits a periphery of a target object located in the first view to obtain a delimiting trajectory from the interframe displacement, and to close the delimiting trajectory to form a full-perimeter geometry; and a projecting module configured to project the full-perimeter geometry on a plane where a direction of the sight is perpendicular to a plane where the target object is located so as to obtain a projection region, so as to separate the projection region from the first view as a segmented image, and to perform an image identification using the projection region as an identification region of the target object.

5. The image identification device according to claim 4, wherein the recording module is configured to close the delimiting trajectory to form the full-perimeter geometry by a closed curve optimization algorithm.

6. The image identification device according to claim 4, wherein the one or more software modules further comprises:

a receiving module configured to receive an image identification request input via speech, a touch screen or a dynamic sensor so as to trigger an operation of acquiring the hand feature region within the sight from the first view by the skin color detection.

7. A non-transitory computer readable storage medium, comprising a computer program configured to execute the following steps on one or more computing devices:

acquiring a hand feature region within a sight from a first view by a skin color detection, and capturing and tracking the hand feature region in real time in the first view;

acquiring a feature and a position of a tip of a finger from the hand feature region by performing a pattern recognition for a morphological feature of a stretched hand, and capturing and tracking the feature and the position of the tip of the finger in real time;

recording an interframe displacement of a feature point of the tip of the finger when the tip of the finger delimits a periphery of a target object located in the first view to obtain a delimiting trajectory from the interframe displacement, and closing the delimiting trajectory to form a full-perimeter geometry; and projecting the full-perimeter geometry on a plane where a direction of the sight is perpendicular to a plane where the target object is located so as to obtain a projection region, so as to separate the projection region from the first view as a segmented image, and performing an image identification using the projection region as an identification region of the target object.

* * * * *